UNITED STATES PATENT OFFICE.

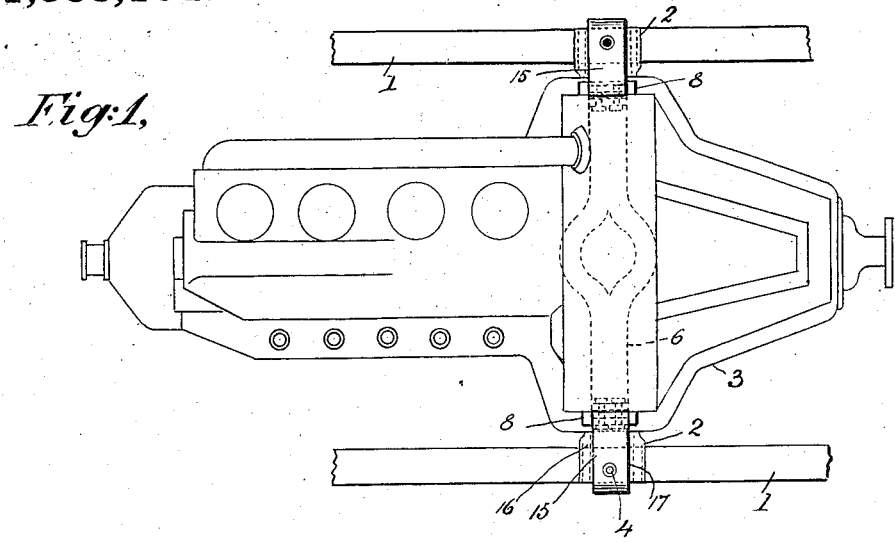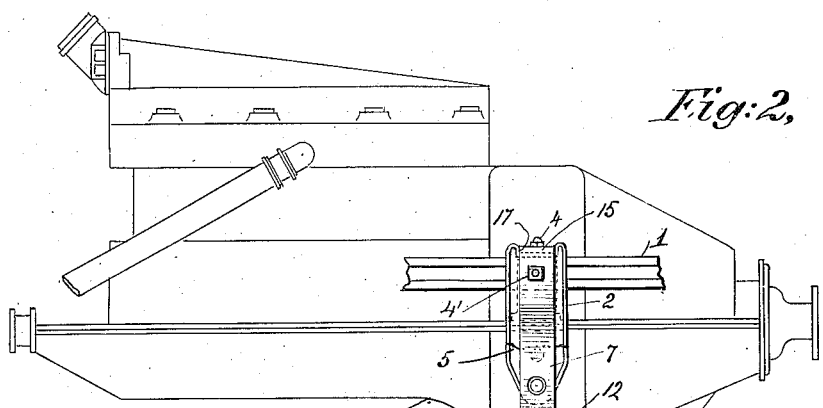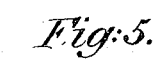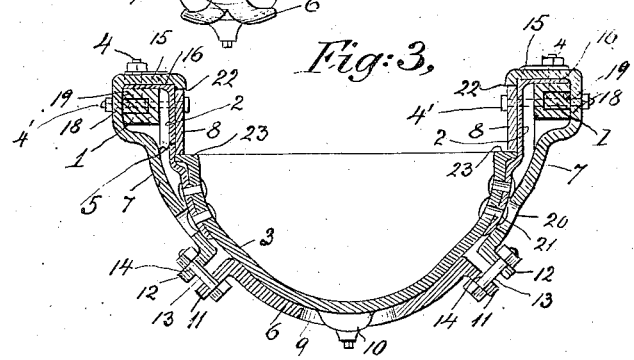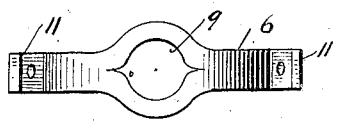

GEORGE DOTTERWEICH, OF RICHMOND HILL, NEW YORK.

AUTOMOBILE-ENGINE SUPPORT.

1,388,104. Specification of Letters Patent. Patented Aug. 16, 1921.

Application filed June 13, 1919. Serial No. 303,915.

*To all whom it may concern:*

Be it known that I, GEORGE DOTTERWEICH, a citizen of the United States, residing at Richmond Hill, in the borough of Queens and State of New York, have invented a new and useful Automobile-Engine Support, of which the following is a specification.

My invention relates to improvements in engine supports and especially in supports adapted for the Ford engine, when attached to an automobile chassis, in which, more specifically the present form and manner of attachment to the chassis frame is improved and safeguarded, and among the objects of my improvements are:

First: To provide a repair piece suitable for rapid adjustment in case of break down or partial destruction of the attachments now provided for securing the engine casing to the chassis frame of an automobile.

Second: To provide a safety cradle in which the engine casing can rest in addition to the present means of holding the same in position.

Third: To provide as an article of commerce an automobile engine support of which certain parts thereof are suitably and permanently placed in position prior to leaving the point of departure, and other parts thereof are carried during the journey, to be used for instant attachment in the event of necessary needed repairs.

I attain these objects by the mechanism illustrated in the accompanying drawing, in which—

Figure 1, is a plan view of a Ford engine and engine casing showing my invention applied thereto;

Fig. 2, is a longitudinal side elevation of the same;

Fig. 3, is a cross-sectional view of the engine casing and chassis frame with my appliance attached thereto;

Fig. 4, is a plan view of the central portion of my engine support, and

Fig. 5, is a perspective view of a hold-down plate used in conjunction with my invention.

Similar numerals refer to similar parts throughout the several views.

The means at present provided for attaching the engine case to the chassis frame 1 of a Ford car consist of two hanger lugs 2, one of which is riveted and welded to either side of engine case 3, and the free ends of such lugs 2, are resting upon the chassis frame 1 and are firmly attached thereto by means of bolts 4, as shown in Fig. 3, of drawings.

The severe jolts to which every part of an automobile car is subjected to have been the means of dislocating the exact position of the engine case by bending or usually breaking one or both of the lugs 2, as indicated at 5, and thereby throwing the engine casing out of proper alinement and causing an interference with the proper working conditions of the engine, in most cases causing a complete breakdown. In order to obviate such breakdowns I have provided a cradle like support consisting of a lower centrally located cradle 6, the two side arms 7—7 and the two hold down blocks 8—8.

The entire cradle support is preferably made from strong steel bars or plates and is fashioned to conform exactly to the outer shape of the engine casing 3. An annular opening 9, is provided to permit the oil drain cup 10 of casing 3, to protrude therefrom.

This cradle 6, has on either end an outwardly turned up lip 11.

One end of the side arm 7 is also provided with an outward turned up lip 12 and is designed to be connected to the lips 11 of saddle 6 by means of one or more bolts 13, which pass through bolt-holes 14, provided for this purpose in the lips 11 and 12.

The other and upper end of the side arm 7, has an inwardly extending lip 15, designed to rest upon the upper side 16 of the permanent hanger lugs 2 of the engine casing 3 and the width and shape of the inward extending lip 15 of side arm 7 is made to coincide with the dimensions and shape of the permanent hanger lug 2, as seen in Fig. 2 of drawing where the lip 15 rests snugly and securely within the grooved portion 17 of hanger lug 2. The portion 18 of the side arm 2 rests securely against the outer side 19 of chassis frame 1, and extends downwardly and is in shape coinciding with the outer form of the engine casing 3. Openings 20 are provided to permit existing rivet heads 21 to protrude.

The hold down blocks 8—8 are introduced on the inner side of the permanent lugs 2 and are of sufficient proportions to snugly fit between the projecting under side 22 of lip 15 and the upper side of the rim 23 of the engine casing.

If now the nuts of bolts 13 are tightly screwed down the entire safety cradle will hold the engine casing securely in place and the same can be brought back to the proper alinement by the proper and judicious use of the bolts 13 and any fractured pieces similar to 5 as shown in Fig. 3 of drawing are thereby firmly retained in place and do not require any immediate replacements, the auxiliary saddle support together with the hold down bolts 8 serving to secure the needed permanent rigidity of the engine casing.

The bolts 4 at present provided by the Ford car may be removed and other bolts substituted therefor and of sufficient length to pass through bolt holes provided for this purpose in the upper lips 15 of the side arms 2.

It is readily seen that by means of my invention additional support can be provided for the engine casing 3, by making the same a permanent adjunct to the chassis frame.

The side arms 7 may be permanently attached to the chassis frame by means of bolts 4', with the hold down blocks 8 inserted so as to stiffen the lugs 2 and prevent dislocation of engine casing by jars and jolts, to which the car is subjected. The central cradle 6 may be carried on the journey and used as an additional means of support and for realinement purposes should any necessity arise for this purpose.

It is obvious that instead of flat bars, any other cross-sectional shape such as channel bars or T iron may be adopted for this purpose in order to provide additional strength for the different parts of my invention.

Having thus described my invention, what I claim is:

An automobile engine support comprising a cradle formed of a central support 6, side arms 7, inwardly extending lugs 15, hold-down blocks 8 introduced between the upper surface of the outer rim of the engine casing and the nether side of the projecting inwardly extending lugs 15 of the cradle, and tightening bolts 13, as and for the purpose herein set forth.

GEORGE DOTTERWEICH.